Figure 1:
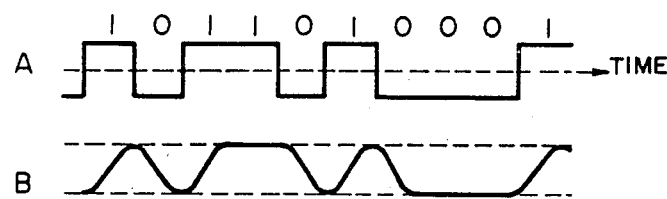

United States Patent [19]

Kato et al.

[11] Patent Number: 4,567,602
[45] Date of Patent: Jan. 28, 1986

[54] CORRELATED SIGNAL PROCESSOR

[75] Inventors: Shuzo Kato, Yokohama, Japan; Kamilo Feher, Ottawa, Canada

[73] Assignee: Canadian Patents and Development Limited, Ottawa, Canada

[21] Appl. No.: 503,574

[22] Filed: Jun. 13, 1983

[51] Int. Cl.$^4$ .................. H03K 1/02; H04L 27/20
[52] U.S. Cl. ................................. 375/60; 375/67; 332/16 R
[58] Field of Search ............... 375/44, 45, 46, 47, 375/48, 49, 60, 64, 67, 62; 332/16 R, 21; 364/604; 332/23, 23 A

[56] References Cited

U.S. PATENT DOCUMENTS

| | | | |
|---|---|---|---|
| 3,518,680 | 6/1970 | McAuliffe | 375/59 |
| 3,731,233 | 5/1973 | Hutchinson | 375/64 |
| 4,324,001 | 4/1982 | Rhodes | 375/47 |
| 4,338,579 | 7/1982 | Rhodes | 375/62 |

OTHER PUBLICATIONS

Volertas, "Phase Modulation Techniques for Digital Communication Systems", Published International Telecommunication Conference Proceedings, Oct. 9, 1977.

*Primary Examiner*—Robert L. Griffin
*Assistant Examiner*—Stephen Chin
*Attorney, Agent, or Firm*—Pascal & Associates

[57] ABSTRACT

A cross-correlated baseband signal processor for providing in-phase and quadrature phase shifted NRZ signals from an input signal, apparatus for cross-correlating the in-phase and quadrature shifted signals, and apparatus for generating in-phase and quadrature shifted intersymbol-interference and jitter free (IJF) modulated output signals having amplitudes such that the vector sum of the output signals is approximately the same at virtually all phase angles of each bit period. The resultant cross-correlated bandlimited PSK signal (XPSK) has an almost constant envelope and thus it can be passed through a saturated amplifier without AM/PM and AM/AM degradation and without the need for post-amplification filtering, as there is no spectral restoration (regrowth).

14 Claims, 8 Drawing Figures

IJF SIGNAL AFTER CROSS CORRELATION

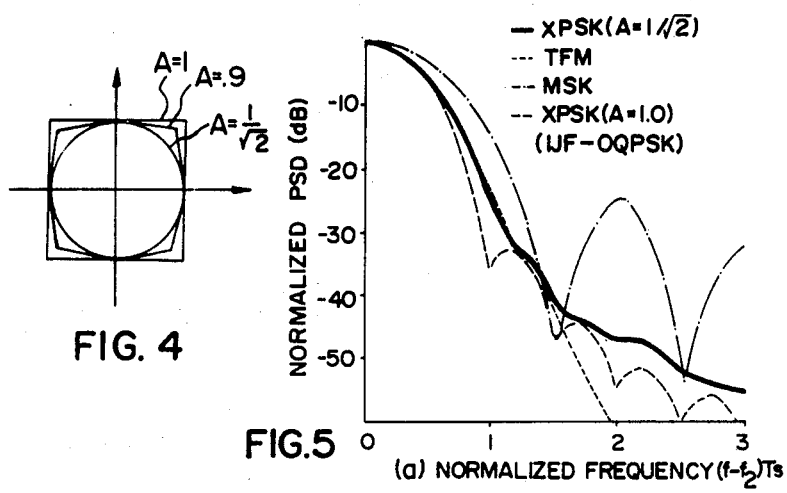

CORRELATED SIGNAL PROCESSOR

This invention relates to a signal processor which is particularly useful for bondwidth and power efficient phase shift keying of shaped non-return to zero (NRZ) pulse signals.

In satellite and terrestrial radio systems, quadrature phase-shift keying (QPSK) modems are frequently used. However when filtering is needed to reduce the bandwidth, the filtered QPSK signal is degraded by AM-to-AM and AM-to-PM conversion after passing through a non-linear device, for example, a high power amplifier. The resulting spectral spreading introduces adjacent channel interference and degrades the bit error rate performance. In many applications, including TDMA systems, it is difficult and/or uneconomical to design channel shaping band pass filters which are located after the non-linear high power transmit amplifier which is operated in saturation.

A special form of non-linearly switched base band filtering strategy is used in an offset-quadrature phase shift keying modulation technique in this invention, which has been found to be both intersymbol-interference and jitter free (IJF). The filter (referred to herein as an IJF filter) is described in U.S. Pat. No. 4,339,724 issued July 13th, 1982 to K. Feher. This form of filter is also described in the text DIGITAL COMMUNICATIONS, SATELLITE/EARTH STATION ENGINEERING by Dr. Kamilo Feher, pages 118-120 (Prentice Hall Inc., 1983). In that design, for a $-1$ to $+1$ transition of the unfiltered NRZ input signal, the rising segment of a sinusoid is switched on (connected to the transmission medium). For a $+1$ to $-1$ transition the following segment of a sinusoid is switched on. For a continuous sequence for 1's or $-1$'s (more than one input bit without transition) a positive or negative DC segment is switched on. Decision logic provides the switch position control signals.

However, due to a 3 dB envelope fluctuation in the modulation technique referred to above (IJF-OPQSK) the power spectrum spreads slightly after passing through a non-linear high power amplifier and suffers emitted power degradation due to AM/PM conversion.

In order to reduce envelope fluctuation, in recent years several envelope modulation schemes have been proposed. Examples are tamed frequency modulation (TFM) by Philips Laboratories (DIGITAL COMMUNICATION, page 443) and correlative phase shift keying as an expansion and generalization of tamed frequency modulation. In these modulation schemes, phase transitions are smooth and correlated, providing improved spectrum efficiency. However the apparatus required is relative by complex.

In the present invention, cross correlation between the basebond in-phase channel and quadrature channels of non-linear switched filter signals or other classes of IJF signals is provided. Modulated cross correlated phase shift keyed (XPSK) signals can be selected to have an envelope fluctuation from 3 dB (equal to IJF-OQPSK) to approximately 0 DB (quasi-constant envelope), depending on specific systems of non-linearities and desired bit error rate. The performance of the quasi-envelope XPSK system has been found to be practically the same as that of tamed frequency modulation systems. However the XPSK signal can be demodulated by conventional OQPSK demodulator, while the tamed frequency modulation demodulator requires a more complex signal processing approach, including two bit delay lines combined with modulo 2 addition. Consequently it is believed that the present invention is considerably less expensive to implement.

It should be noted that the present invention can be used in earth stations for satellite systems, microwave systems, indeed any system in which modulation of digital signals is utilized.

The present invention utilizes in-phase and quadrature phase shifted NRZ digital signals which are IJF encoded and cross correlated in order to reduce the envelope fluctuation. The peak signal amplitudes of the two output baseband streams (in-phase and quadrature), in which the quadrature is offset from the other signal by one-half the symbol, are reduced from 1 (normalized) to A, where A is between 1 and $$\frac{1}{\sqrt{2}}.$$

At every sampling instant of one channel, whenever the other channel is zero, the first channel signal has the maximum value assigned to its particular wave shape.

For this baseband signal wave shaping, four transitional functions and sine and cosine components are used, which are selected to provide less envelope fluctuation than that of the IJF-OQPSK signal.

Due to the resulting substantially reduced envelope fluctuation, and since the sidebands are very low amplitude, the modulated signal can be passed through a saturated high powered amplifier without further filtering, once modulated on a carrier. Thus the cost of a transmission channel is further substantially reduced.

The preferred embodiment of the invention is a cross-correlated bit signal processor comprising apparatus for providing in-phase and quadrature phase shifted NRZ basebond signal input signals, apparatus for cross-correlating each two symbols of the in-phase signals with each two symbols of the quadrature signal, every half symbol, and providing in-phase and quadrature phase shift IJF encoded modulated output signals having amplitudes modified from the peak amplitudes of the IJF encoded signals according to the following schedule: (i) when the in-phase channel signal is zero, the quadrature shifted signal is the maximum IJF amplitude according to its wave shape, (ii) when the in-phase channel signal is non-zero, the maximum magnitude of the quadrature shifted signal is reduced from 1 (normalized) to A, where $$\frac{1}{\sqrt{2}} \leq A \leq 1,$$

(iii) when the quadrature channel signal is zero, the in-phase signal is the maximum IJF amplitude according to its wave shape, (iv) when the quadrature channel signal is non-zero, the in-phase signal is reduced from 1 (normalized) to A, where $$\frac{1}{\sqrt{2}} \leq A \leq 1.$$

More generally, the cross-correlated signal processor according to the invention is comprised of apparatus for providing in-phase and quadrature phase shifted NRZ basebond signals of an input signal, apparatus for cross-correlating the in-phase and quadrature shifted signals, and apparatus for generating in-phase quadrature shifted IJF encoded output modulated signals having amplitudes such that the vector sum of the output signals is approximately the same at all phase angles of each bit. This means that an approximately constant envelope bandlimited modulated signal is obtained.

Figure 2:
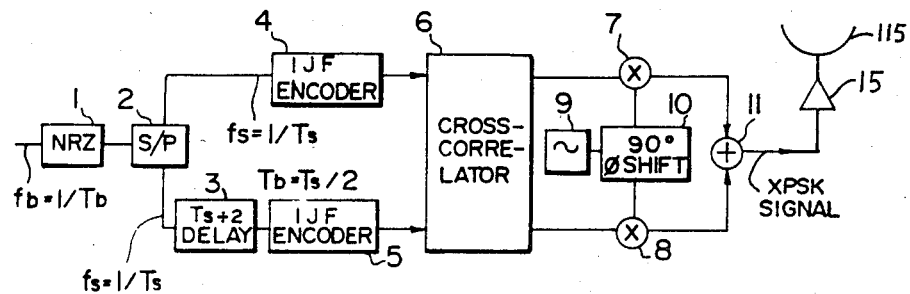
Figure 3:
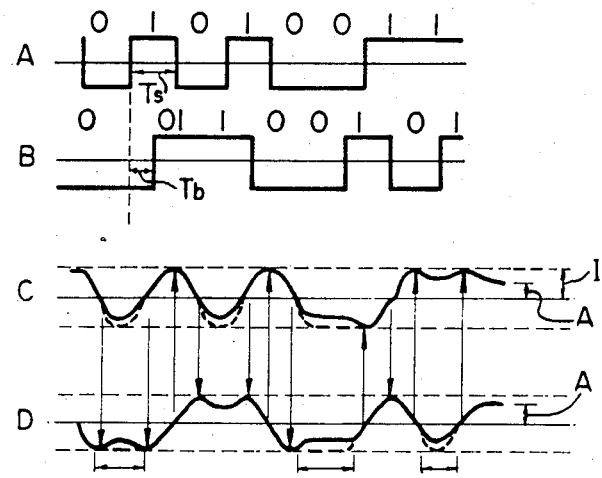
Figure 7:
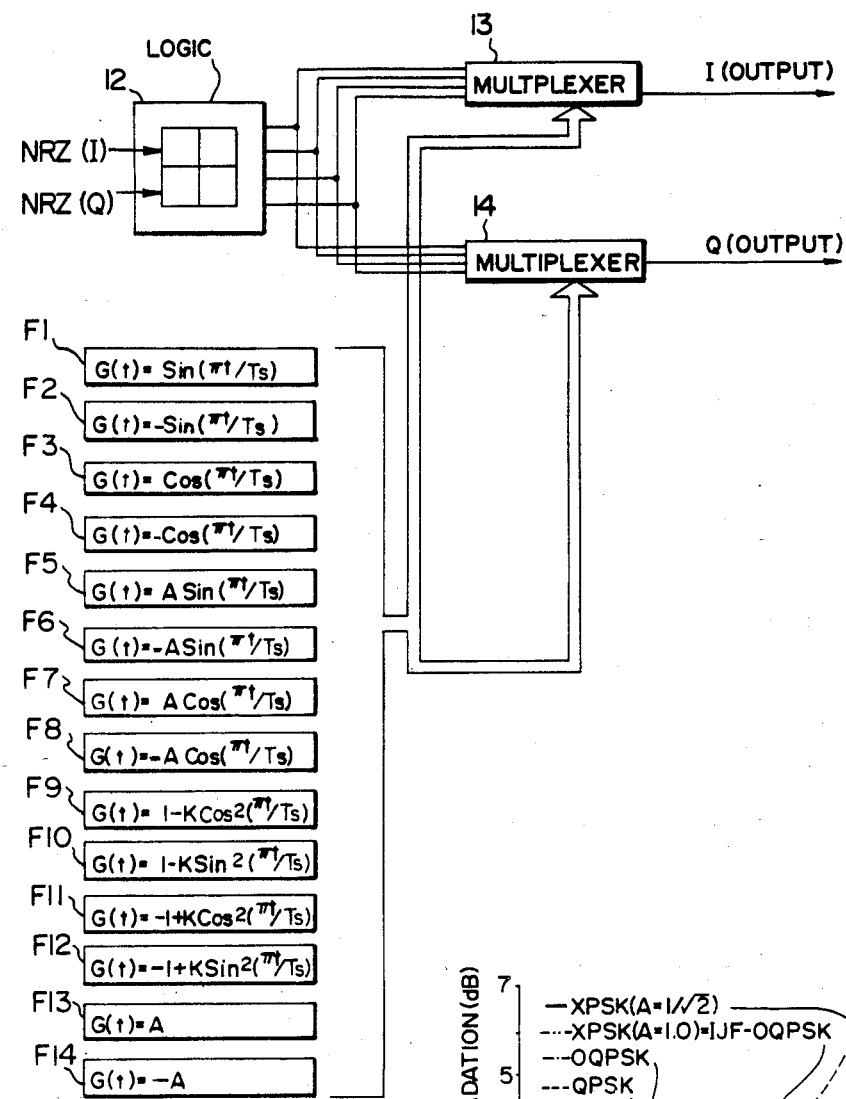
Figure 8:
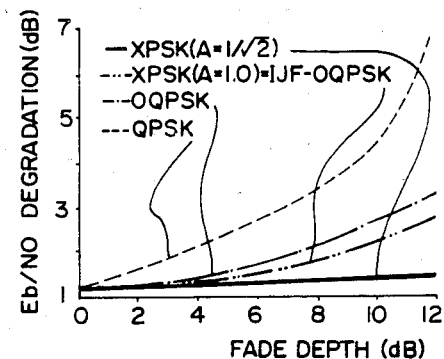

A more detailed understanding of the invention may be obtained by reference to the detailed description below, in conjunction with the following drawings, in which:

FIG. 1 shows NRZ signal and resulting IJF encoded signal,

FIG. 2 is a simplified conceptional block diagram of a radio transmission channel utilizing the present invention, FIG. 3 shows waveform diagrams A–D used to illustrate modification of the IJF encoded signals to signals resulting from the use of the present invention, FIG. 4 is a state diagram showing the phase relationships between the in-phase and quadrature signals and the envelope fluctuations, FIG. 5 is a graph showing the frequency components of the output signal according to the present invention and previous modulation schemes, FIG. 6 is a table of wave forms which are generated in the present invention, FIG. 7 is a block diagram of the present invention, and FIG. 8 is a diagram illustrating comparative signal degradation with fading.

FIG. 1, waveform A, shows an NRZ input signal, and waveform B shows the same signal after being IJF encoded, according to the aforenoted textbook and U.S. patent or by any other means. For example IJF encoded signals can be also obtained by overlapping raised cosine pulses, as described in I.E.E.E. Transactions on Communication, Vol: COM-27. No. 11 Nov. 1979, page 1700–1711, by Huang, Feher and Gendron. It may be seen that a sinusoidal waveform is substituted for the $-1$ to $+1$ transitions of the unfiltered NRZ input signal, and a DC signal is substituted for a continuous sequence of 1's or $-1$'s. While this signal is bandwidth-efficient (having substantially reduced sidebands) and intersymbol interference free, in a QPSK modulation circuit, envelope fluctuation has been encountered at all phase differences except where the signals are 90° apart (see FIG. 4, waveform A = 1). The maximum of fluctuation occurs where the phase differences are 45°, 135°, 225° and 315°, and results from vector addition of the two signals.

In the present invention, however, the basebond signals of an in-phase and quadrature modulator are cross-correlated, and the amplitudes of the IJF encoded signals are reduced, indeed, they are reduced to an amplitude $$A = \frac{1}{\sqrt{2}}$$

according to a particular scheme to be described below, in order that the vector sum of the two signals are approximately equal, that is, forming a state diagram which is a quasi-circle (see FIG. 4) waveform $$A = \frac{1}{\sqrt{2}}.$$

In this case it is clear that envelope fluctuation is minimum.

FIG. 2 is a block diagram of a cross-correlated phase shift keyed modulator which can be used, for example, in the ground station of a satellite transmission system. An NRZ digital source 1 provides an input signal to serial to parallel converter 2, which provides two data streams consisting of alternate bits. A Ts/2 delay 3 shifts one of the two data streams by one-half a symbol period, whereby an in-phase NRZ signal is applied to IJF encoder 4 and a quadrature NRZ signal phase shifted by Ts/2 is applied to IJF encoder 5. Note that the assumed bit rate (input to device 2) is $f_b$ and the bit duration is $T_b = 1/f_b$. After the serial to parallel converter we have an $f_s = \frac{1}{2} f_b$ symbol. Thus $T_s = 2T_b$. Both signals are IJF encoded as described with reference to FIG. 1, using a technique described in the aforenoted U.S. patent, or any other technique which would provide the same result. IJF encoded in-phase and quadrature shifted signals are applied to a cross-correlator 6, in which the signals are cross-correlated according to the logical rules to be described below, and their amplitudes reduced during particular intervals. The output signals from cross-correlator 6 are in-phase (I) and quadrature phase (Q) shifted IJF basebond encoded output signals having modified amplitudes, which are applied to multipliers 7 and 8 respectively. These multpliers serve as conventional double-sided and suppressed carrier AM modulators, widely used in BPSK and QPSK system designs. The resulting output signals from multipliers 7 and 8 are applied to a summer 11 where they are added together, the output signal from summer 11 being the XPSK signal. The XPSK signal can be applied to a high powered amplifier 15 without further filtering, for transmission to an antenna, in which the high power amplifier is operated in its saturated (hard limited) mode.

In the cross-correlator, the IJF encoded signals are modified as follows. When the in-phase channel signal is zero, the quadrature shifted signal is the maximum IJF amplitude according to its wave shape. When the in-phase channel is non-zero, the maximum magnitude of the quadrature shifted signal is 1 reduced from 1 (one) (normalized) to A, where A is between $$\frac{1}{\sqrt{2}}.$$

When the quadrature channel signal is zero, the in-phase signal is the maximum IJF amplitude according to its wave shape. When the quadrature channel signal is non-zero, the in-phase signal is reduced from 1 to A, where A is between 1 and $$\frac{1}{\sqrt{2}}.$$

While A can be varied according to the parameters of the system, there will be minimum envelope fluctuation when $$A = \frac{1}{\sqrt{2}}.$$

It should be noted that the modulation can be implemented at I.F. or at R.F. frequencies.

FIG. 3 shows an in-phase basebond NRZ signal in waveform A, and a quadrature shifted NRZ signal in waveform B. This latter signal is shifted by $T_b = T_s/2$. Waveforms C and D show the IJF encoded corresponding waveforms respectively, in which the dashed portions of the waveform represent the pure IJF encoded signals, and the solid lines represent the waveforms after cross-correlation. The vertical arrows indicate from the zero value of one waveform, that the maximum value of the other waveform is utilized. However at other positions the reduced amplitude value is utilized. The zero positions of each waveform of course corresponds to the 90°, 180°, 270° and 0° relative phase positions of the state diagram shown in FIG. 4. Consequently the dashed line waveforms correspond to waveform A=1 in FIG. 4, while the solid waveforms in FIG. 3 correspond to the waveform $$A = \frac{1}{\sqrt{2}}$$

quasi-circle in FIG. 4.

FIG. 5 shows a frequency VS amplitude chart in the frequency domain of the resulting XPSK signal in comparison with the quadrature phase shift keyed modulated signal which is merely IJF encoded (i.e. A=1), tamed frequency modulated signal, etc. It may be seen that in the most critical frequency range, which is the main lobe region, close to the unmodulated carrier frequency, the XPSK signal in which $$A = \frac{1}{\sqrt{2}}$$

is approximately equal or slightly better in terms of sideband components than the TFM modulated signal.

According to the invention, where one signal changes its bit value in two consecutive bits while the other signal bit value remains the same, the following functions are generated, according to the IJF encoding scheme described in the aforenoted text and patent:

G (t) = A sin ($\pi$t/Ts)

G (t) = –A sin ($\pi$t/Ts)

G (t) = A cos ($\pi$t/Ts)

G (t) = –A sin ($\pi$t/Ts)

Where one signal does not change its bit value in two consecutive bits while the other signal does not change its bit value, one of each of the following four functions is switched to the output to form the IJF encoded signal:

G (t) = 1 – K cos²($\pi$t/Ts)

G (t) = 1 – K sin²($\pi$t/Ts)

G (t) = –1 + K cos²($\pi$t/Ts)

G (t) = –1 + K sin²($\pi$t/Ts)

where K = 1 – A.

Where one signal changes its bit value in two consecutive bits while the other changes its bit value, one of the following four functions is switched to the output:

G (t) = sin ($\pi$t/Ts)

G (t) = –sin ($\pi$t/Ts)

G (t) = Cos ($\pi$t/Ts)

G (t) = –Cos ($\pi$t/Ts)

Where one signal does not change its bit value in two consecutive bits while the other changes its bit value, one of the two functions G (t) = A G (t) = –A is switched to the output.

It should be noted that the output referred to is the output of the signal under consideration. For example, where one signal does not change its bit value during two consecutive bits while the other changes its bit value, the function A relates to the unchanging bit value.

In the aforenoted functions, A can be set between 1 and ½, depending on system parameters, and t/Ts is the function interval, where Ts is the symbol interval. The function G(t) follow each other according to IJF encoding without discontinuities, to provide cross-correlated phase shift keyed in-phase and quadrature output signals. These are the signals output from cross-correlator 6, in FIG. 2.

In order to provide the in-phase and quadrature shifted output signals, function generators are utilized which generate the signals noted above, and are connected to two multiplexers. The in-phase and quadrature shifted NRZ signals are applied to a logic circuit, the output of which is applied to the control inputs of the multiplexers. Accordingly at the appropriate interval, the signal functions are multiplexed in time and output as in-phase and quadrature shifted IJF encoded output signals having the modified amplitudes as described above. The non-constant signal functions must of course be synchronized to the input data signals. It is preferred that the function interval should be $\pi/2$ radians.

FIG. 7 is a block diagram of the basic form of the invention. The in-phase and quadrature NRZ data signals are applied to a logic circuit 12, where each two bits of each signal is correlated with the other, to provide a four bit output signal. The result is 16 possible combinations. The four bit output signal is applied to the control inputs of multiplexers 13 and 14.

Function generators F1–F14 have their outputs connected to the appropriate inputs of multiplexers 13 and 14. The function generators generate signals in a well known manner, synchronized by means of a clock with the NRZ input signals, the functions being produced following the wave shapes expressed within the function generator blocks F1–F14. While there are sixteen different combinations, functions F13 and F14 are repeated.

The wave shapes formed by each of the function generators are shown in FIG. 6, labelled W1–W14 to correspond with functions F1–F14, waveshape W15 and W16 corresponding to functions F13 and F14 respectively.

Since IJF coding is well known, and the manner of formation of the wave shapes also well known, it is believed to be redundant to describe a specific logic circuit and specific function generators which provide the signals applied to the sixteen port multiplexers 13 and 14 since the algorithmaric sequence by which various functions are switched to the output are described above, which will control the specific terminals of the multiplexers of which the function generators are applied, and the control input ports to which the logic control signals are applied.

The present cross-correlated XPSK modulation technique has shown substantial improvement in resistance to degradation during fading over QPSK and IJF-OQPSK types of modulation schemes. For example, at a fade depth of 12 dB, there is a reduction is degradation in excess of 1 dB over the IJF-OQPSK (XPSK where A=1) technique. As a result antenna size can be reduced, and, as noted above, transmission channel filtering after the high powered amplification need not be utilized, while the high powered amplifier can be operated in its saturated (hard limited), most economical mode. As a result a substantial decrease in the cost of such systems can be realized. In addition, of course, the invention is not limited to a single channel per carrier.

A person understanding this invention may now conceive of other embodiments or variations, utilized the principles described herein. All are considered to be within the sphere and scope of this invention as defined in the claims appended hereto.

We claim:

1. A cross-corrected signal processor comprising:
   (a) means for providing in-phase and quadrature phase shifted NRZ digital input signals,
   (b) means for cross-correlating each two symbols of the in-phase signal with each two symbols of the quadrature signal, every half symbol and providing in-phase and quadrature phase shifted intersymbol-interference and jitter free (IJF) encoded output signals having amplitudes modified from the peak amplitudes of IJF encoded signals according to the following schedule:
   (i) when the in-phase channel signal is zero, the quadrature shifted signal is the maximum IJF amplitude according to its wave shape,
   (ii) when the in-phase channel signal is non-zero, the maximum magnitude of the quadrature shifted signal is reduced from 1 normalized to A, where $$\frac{1}{\sqrt{2}} \leq A \leq 1,$$

(iii) when the quadrature channel signal is zero, the in-phase signal is the maximum IJF amplitude according to its wave shape,
   (iv) when the quadrature channel signal is non-zero, the in-phase signal is reduced from 1 (normalized) to A, where $$\frac{1}{\sqrt{2}} \leq A \leq 1,$$

(c) and means for quadrature modulating the in-phase and quadrature output signals, to provide a cross-correlated modulated output signal.

2. A signal processor as defined in claim 1, in which $$A = \frac{1}{\sqrt{2}}.$$

3. A signal processor as defined in claim 1, in which the one signal changes its bit value in two consecutive bits while the other signal bit value remains the same, including means for generating the functions:

$G(t) = A \sin(\pi t/Ts)$ $G(t) = -A \sin(\pi t/Ts)$ $G(t) = A \cos(\pi t/Ts)$ $G(t) = -A \cos(\pi t/Ts)$ and in which the said one signal does not change its bit value in two consecutive bits while said other signal does not change its bit value, including means for generating the functions $G(t) = 1 - K \cos^2(\pi t/Ts)$ $G(t) = 1 - K \sin^2(\pi t/Ts)$ $G(t) = -1 + K \cos^2(\pi t/Ts)$ $G(t) = -1 + K \sin^2(\pi t/Ts)$ where $K = 1 - A$
and in which said one signal changes its bit value in two consecutive bits while said other signal changes its bit value, including means for generating the functions $G(t) = \sin(\pi t/Ts)$ $G(t) = -\sin(\pi t/Ts)$ $G(t) = \cos(\pi t/Ts)$ $G(t) = -\cos(\pi t/Ts)$ and in which said one signal does not change its bit value in two consecutive bits while said other signal changes its bit value, including means for generating the functions $G(t) = A$ $G(t) = -A$ in which $$\frac{1}{\sqrt{2}} \leq A \leq 1$$

t/Ts is the function interval, where Ts is the symbol, the functions G(t) following each other according to IJF encoding without discontinuation, to provide said cross-correlated phase shifted keyed in-phase and quadrature output signals.

4. A signal processor as defined in claim 3, including means for multiplexing said functions serially according to cross-correlation between said in-phase and quadrature signals to provide said output signals.

5. A signal processor as defined in claim 3 or 4, in which the function interval is $\pi/2$ radians.

6. A cross-correlated signal processor comprising:
(a) means for providing in-phase and quadrature phase shifted NRZ signals from an input signal,
(b) means for cross-correlating the in-phase and quadrature shifted signals,
(c) means for generating in-phase and quadrature shifted intersymbol-interference and jitter free (IJF) encoded output signals having amplitudes such that the vector sum of the output signals is approximately the same at virtually all phase angles of each bit period,
(d) and means for quadrature modulating the in-phase and quadrature output signals, to provide a cross-correlated modulated output signal.

7. A signal processor as defined in claim 6, including means for cross-correlating each two symbols of the in-phase signal with each two symbols of the quadrature shifted signal, every half symbol, and for generating in-phase output and quadrature shifted output signals having IJF coded waveforms with amplitudes according to the following schedule:
(i) when the in-phase channel signal is zero, the quadrature shifted signal is the maximum IJF amplitude according to its wave shape,
(ii) when the in-phase channel signal is non-zero, the maximum magnitude of the quadrature shifted signal is reduced from 1 (normalized) to A, where $$\frac{1}{\sqrt{2}} \leq A \leq 1,$$

(iii) when the quadrature channel signal is zero, the in-phase signal is the maximum IJF amplitude according to its wave shape,
(iv) when the quadrature channel signal is non-zero, the in-phase signal is reduced from 1 (normalized) to A, where $$\frac{1}{\sqrt{2}} \leq A \leq 1.$$

8. A signal processor as defined in claim 7 where $$A = \frac{1}{\sqrt{2}}.$$

9. A signal processor as defined in claim 1, further including means for quadrature modulating the in-phase and quadrature output signals, to provide a cross-correlated modulated output signal.

10. A signal processor as defined in claim 6 further including a local oscillator, for providing a carrier signal, means for phase shifting the carrier signal by 90°, means for multiplying the carrier signal with either the in-phase output signal or the quadrature output signal to provide a first modulated signal, means for multiplying the phase shifted carrier signal with the other of the in-phase output signal or the quadrature output signal to provide a second modulated signal, and means for summing the modulated signals, to provide a cross-correlated modulated signal having low envelope fluctuation, controlled spectrum and limited sidelobes.

11. A signal processor as defined in claim 1, or 6, further including a local oscillator, for providing a carrier signal, means for phase shifting the carrier signal by 90°, means for multiplying the carrier signal with either the in-phase output signal or the quadrature output signal to provide a first modulated signal, means for multiplying the phase shifted carrier signal with the other of the in-phase output signal or the quadrature output signal to provide a second modulated signal, and means for summing the modulated signals, and means for applying the summed modulated signals to a high power output amplifier operated in its saturated mode, for amplification and transmission to an antenna.

12. A signal processor comprising means for cross-correlating in-phase and quadrature phase shifted NRZ input signals, and means for receiving said signals and for generating in-phase and quadrature shifted intersymbol-interference and jitter free (IJF) encoded output signals from said signals having amplitudes such that the vector sum of the output signals is approximately the same at virtually all phase angles at each bit period.

13. A cross-correlated signal processor comprising:
(a) means for cross-correlating each two symbols of an in-phase NRZ digital signal with each two symbols of a quadrature phase shifted signal of the in-phase signal, every half symbol and providing in-phase and quadrature phase shifted intersymbol-interference and jitter free (IJF) encoded output signals having amplitudes modified from the peak amplitudes of IJF encoded signals according to the following schedule:
(i) when the in-phase channel signal is zero, the quadrature shifted signal is the maximum IJF amplitude according to its wave shape,
(ii) when the in-phase channel signal is non-zero, the maximum magnitude of the quadrature shifted signal is reduced from 1 (normalized) to A, where $$\frac{1}{\sqrt{2}} \leq A \leq 1,$$

(iii) when the quadrature channel signal is zero, the in-phase signal is the maximum IJF amplitude according to its wave shape,
(iv) when the quadrature channel signal is non-zero, the in-phase signal is reduced from 1 (normalized) to a, where $$\frac{1}{\sqrt{2}} \leq A \leq 1,$$

(v) and means for quadrature modulating the in-phase and quadrature output signals to provide a cross-correlated modulated output signal.

14. A cross-correlated signal processor comprising:
(a) means for providing in-phase and quadrature phase shifted NRZ digital input signals,
(b) means for cross-correlating each two symbols of the in-phase signal with each two symbols of the quadrature signal, every half symbol and providing in-phase and quadrature phase shifted intersymbol-interference and jitter free (IJF) encoded output signals having amplitudes modified from the peak amplitudes of IJF encoded signals according to the following schedule:

(i) when the in-phase channel signal is zero, the quadrature shifted signal is the maximum IJF amplitude according to its wave shape, (ii) when the in-phase channel signal is non-zero, the maximum magnitude of the quadrature shifted signal is reduced from 1 (normalized) to A, where $$\frac{1}{\sqrt{2}} \leq A \leq 1,$$

(iii) when the quadrature channel signal is zero, the in-phase signal is the maximum IJF amplitude according to its wave shape, (iv) when the quadrature channel signal is non-zero, the in-phase signal is reduced from 1 (normalized) to A, where $$\frac{1}{\sqrt{2}} \leq A \leq 1,$$

(c) in which the one signal changes its bit value in two consecutive bits while the other signal bit value remains the same, including means for generating the functions:

G (t)=A sin ($\pi$t/Ts)

G (t)=−A sin ($\pi$t/Ts)

G (t)=A cos ($\pi$t/Ts)

G (t)=−A cos ($\pi$t/Ts)

and in which the said one signal does not change its bit value in two consecutive bits while said other signal does not change its bit value, including means for generating the functions G (t)=1−K cos$^2$($\pi$t/Ts)

G (t)=1−K sin$^2$($\pi$t/Ts)

G (t)=−1+K cos$^2$($\pi$t/Ts)

G (t)=−1+K sin$^2$($\pi$t/Ts)

where K=1−A and in which said one signal changes its bit value in two consecutive bits while said other signal changes its bit value, including means for generating the functions G (t)=sin ($\pi$t/Ts)

G (t)=−sin ($\pi$t/Ts)

G (t)=cos ($\pi$s/Ts)

G (t)=−cos ($\pi$t/Ts)

and in which said one signal does not change its bit value in two consecutive bits while said other signal changes its bit value, including means for generating the functions G (t)=A G (t)=−A in which $$\frac{1}{\sqrt{2}} \leq A \leq 1$$

t/Ts is the function interval, where Ts is the symbol, the functions G (t) following each other according to IJF encoding without discontinuation, to provide said cross-correlated phase shifted keyed in-phase and quadrature output signals.

* * * * *